(12) United States Patent
Drewes et al.

(10) Patent No.: US 9,488,236 B2
(45) Date of Patent: Nov. 8, 2016

(54) BRAKE CARRIER

(71) Applicant: SAF-HOLLAND, GmbH, Bessenbach (DE)

(72) Inventors: Olaf Drewes, Aschaffenburg (DE); Armin Christ, Bessenbach (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 142 days.

(21) Appl. No.: 14/355,076

(22) PCT Filed: Dec. 13, 2012

(86) PCT No.: PCT/EP2012/075311
§ 371 (c)(1),
(2) Date: Apr. 29, 2014

(87) PCT Pub. No.: WO2013/087737
PCT Pub. Date: Jun. 20, 2013

(65) Prior Publication Data
US 2015/0053516 A1 Feb. 26, 2015

(30) Foreign Application Priority Data
Dec. 16, 2011 (DE) .................. 10 2011 088 851

(51) Int. Cl.
| F16D 65/00 | (2006.01) |
| F16D 51/00 | (2006.01) |
| F16D 51/20 | (2006.01) |

(52) U.S. Cl.
CPC ........... F16D 65/0056 (2013.01); F16D 51/00 (2013.01); F16D 51/20 (2013.01); *F16D 2051/003* (2013.01)

(58) Field of Classification Search
CPC .. F16D 2051/003; F16D 51/00; F16D 65/09; F16D 2065/1348; F16D 2065/1388
See application file for complete search history.

(56) References Cited

U.S. PATENT DOCUMENTS 3,599,763 A * 8/1971 Bailey .................... F16D 51/14
188/326
3,604,542 A * 9/1971 Cullen .................... F16D 65/22
188/18 R (Continued)

FOREIGN PATENT DOCUMENTS

| DE | 1455814 | 6/1969 |
| DE | 3909067 | 9/1990 |
| WO | 0146600 | 6/2001 |

OTHER PUBLICATIONS

International Search Report; European Patent Office, Mar. 11, 2013.

*Primary Examiner* — Robert A Siconolfi
*Assistant Examiner* — James Hsiao
(74) *Attorney, Agent, or Firm* — Price Heneveld LLP

(57) ABSTRACT

A brake carrier includes a carrier unit having a first connecting section fixed to a brake cylinder, a second connecting section fixed to a converter unit and a third connecting section fixed at an axle element; a transmission element received between the first and second connecting sections; the brake cylinder, the transmission element and the converter unit are fixed to the axle element by the carrier unit; the transmission element can be displaced mainly along an a transmission axis that is tilted in relation to the wheel axis such that the converter unit is aligned closer to the wheel axis than the brake cylinder; the first connecting section is offset along the wheel axis to the connecting section; and the relation of the offset between the first and third connecting sections and the distance to the wheel axis from the transmission axis has values between about 0.1 and about 2.

26 Claims, 3 Drawing Sheets

(56) References Cited

U.S. PATENT DOCUMENTS

| | | | | |
|---|---|---|---|---|
| 3,666,061 A * | 5/1972 | Nehr | ................ | F16D 51/14 |
| | | | | 188/206 R |
| 4,013,150 A * | 3/1977 | Crabtree | ................ | F16D 65/22 |
| | | | | 188/106 F |
| 4,445,597 A * | 5/1984 | Baltare | ................ | F16D 51/20 |
| | | | | 188/206 A |
| 4,526,254 A * | 7/1985 | Baltare | ................ | F16D 65/08 |
| | | | | 188/206 A |
| 4,537,293 A | 8/1985 | Osborne | | |
| 4,552,254 A * | 11/1985 | Baltare | ................ | F16D 51/20 |
| | | | | 188/206 A |
| 4,666,022 A * | 5/1987 | Layton | ................ | F16D 65/22 |
| | | | | 188/343 |
| 4,858,730 A * | 8/1989 | Baroni | ................ | B60T 1/06 |
| | | | | 188/205 R |
| 5,301,774 A | 4/1994 | Cho et al. | | |
| 5,325,945 A * | 7/1994 | Walker | ................ | B60T 1/067 |
| | | | | 188/206 A |
| 5,887,686 A * | 3/1999 | Tanaka | ................ | F16D 65/00 |
| | | | | 188/250 E |
| 6,148,968 A | 11/2000 | Davison | | |
| 6,415,896 B1 * | 7/2002 | Arai | ................ | F16D 51/20 |
| | | | | 188/106 F |
| 6,843,128 B2 * | 1/2005 | Chen | ................ | G01M 7/00 |
| | | | | 188/381 |
| 8,286,762 B2 * | 10/2012 | Monopoli | ................ | F16D 65/0018 |
| | | | | 188/205 A |
| 2010/0193303 A1 * | 8/2010 | Li | ................ | F16D 51/20 |
| | | | | 188/206 A |

\* cited by examiner

BRAKE CARRIER

BACKGROUND OF THE INVENTION

The present invention refers to a brake carrier of a drum brake, in particular, for utility vehicles.

Brake carriers are known from prior art. Preferably, they are used to fix components of the brake system to the axis or the chassis, respectively, of a utility vehicle. Here, the brake carriers known from prior art are, in most cases, designed discoidally and have a number of recesses or bores, respectively, into which mounting elements are inserted for fixing components to the brake carrier. Often, the brake carriers known from prior art are designed to fix different brake systems to the axis of a utility vehicle, where especially preferably, a circular geometry is chosen, which enables to fix brake components of different sizes to the brake carrier. As a consequence, the brake carrier is overdesigned and heavier. Furthermore, the installation of the brake carrier cannot be automated, but has to be carried out manually with great effort. Thus, there is a significant need for improvement in respect of an optimization of weight and a reduction of mounting efforts.

Therefore, it is the object of the present invention to deliver a brake carrier, especially preferably an expansion wedge drum brake which, by an optimized design, saves weight and simplifies its installation.

SUMMARY OF THE INVENTION

According to the invention, the brake carrier of a drum brake which is preferably designed as an expansion wedge drum brake or an expansion wedge drum brake system, respectively, comprises a carrier unit, where the carrier unit has a first connecting section to which a brake cylinder can be fixed, where the carrier unit has a second connecting section to which a converter unit can be fixed, where a housing region is provided between the first and the second connecting section which seats a transmission element and where the brake cylinder, the transmission element and the converter unit can be fixed to an axle element of the utility vehicle. Especially preferably, the carrier unit is a component which takes over the function of a traditional brake carrier. For this purpose, the carrier unit has a first connecting section to which a brake cylinder can be fixed. Especially preferably, the brake cylinder is a pneumatically operated diaphragm brake cylinder and, preferably, is appropriate for large-scale production, ensuring that the cost price of such a brake cylinder can be kept low. In addition, the carrier unit has a second connecting section for fixing a converter unit. Especially preferably, the converter unit is an expansion wedge unit/an expansion wedge drum brake, where a transmission element reaches into, in order to displace to piston elements that move coaxially one to the other. The preferred primary function of the converter unit is the displacement of the brake shoe elements, especially preferably in order to displace them into a position in which they ensure a friction against a brake drum which is pivoted to the axle of the vehicle. According to the invention, between the first connecting section and the second connecting section, there is a housing region provided which, especially preferably, takes the transmission element and, preferably, supports the converter unit against the brake cylinder. This arrangement is of particular advantage when the brake design is an expansion wedge drum brake. The housing region is preferably a tube- or sleeve-like section of the carrier unit, preferably extending along a transmission axis. By integrating the housing region into the carrier unit, especially the stability of the connection between the converter unit and the brake cylinder is increased, and weight is saved at the same time. For this, brake carriers known from prior art require an additional element, mounted between the brake cylinder and the carrier unit. Here, additional points of intersection are given and, thus, additional sources of errors where, for example, corrosion or an ingress of foreign matter occurs. The carrier unit according to the invention eliminates this disadvantage by especially designed points of intersection of the brake cylinder and the converter unit, i.e. of the first and the second connecting sections. Here, especially preferably, precisely fitting recesses may be provided for screws of similar fixtures for fixing the converter unit and the brake cylinder to the carrier unit. Furthermore, it may be preferred to provide sealing surfaces at the first and second connecting sections, to which the carrier unit and the converter unit can be fixed in a sealed way and, by this means, any ingress of foreign matter or contaminations into the carrier unit or the housing region of the carrier unit is prevented.

This ensures that a reliable displacement of the transmission element and a long service life as well as a reliable function of the drum brake can be achieved. The main function of the carrier unit is to fix the brake cylinder, the transmission element and the converter unit in a defined position relative to the axle element. Here, the carrier unit is especially designed to take the forces and moments arising from the brake process and to transfer them to the axle element.

Preferably, the carrier unit can be fixed at a third connecting section to the axle element, where the first connecting section is located offset along a wheel axis to the third connecting section. The function of the third connecting section of the carrier unit is, in particular, to forward or transfer, respectively, the moments and forces of the carrier unit to the axle element.

Advantageously, the third connecting section has recesses that form-fit to the projections provided at the axle element or other elements as, for example, t-nuts, in order to fix the carrier unit to the axle element. Especially preferably, the third connecting section is mainly curved or spherical, in order to fit to the circular or cylindrical or rotationally symmetric rigid axle of a utility vehicle. Here, alternatively preferably, the axle element can be an axle stub element of the utility vehicle, to which a wheel or a number of wheels of a utility vehicle is pivoted. Especially preferably, the axle element mainly extends along a wheel axis, where, preferably, the third connecting section of the carrier unit may be a cylindrical bore of the carrier unit along the wheel axis. Advantageously, the first connecting section, to which the brake cylinder can be fixed, is offset to the third connecting section along a wheel axis, where, especially preferably, the offset is positive along the direction of the second to the first connecting section. In other words, this means that the first connecting section is relatively offset to the third connecting section in the direction away from the second connecting section or the housing region, respectively. Referring to the function of the brake carrier within the brake system or the chassis system, respectively, it is particularly advantageous that, this way, the first connecting section is spaced from the section at which the wheel of the utility vehicle is pivoted, and that it can be prevented that the brake cylinder comes into contact with the wheel or with rotating parts of the chassis system of the utility vehicle. However, since it is preferred at the same time that the second connecting section, to which a converter unit can be fixed, reaches as far as possible into the rotating area and, in particular, into the rotating brake drum, it is preferred to design the housing portion in an elongated way if the offset between the first and the third connecting section is large. This way, by an ideal design of the housing region of the carrier unit, the arrangements of the brake cylinder and the converter unit can be optimized with reference to their respective functions within the chassis system of the utility vehicle. In other words, this results in a cranked design of the carrier unit, which means that the location of the housing region and the first connecting section is arranged relatively offset along a radial direction to the third connecting section, where the section of the carrier unit is inclined relative to the wheel axis between the first and the third connecting section.

Preferably, the transmission element for force transmission can mainly be displaced along a transmission axis, where the transmission axis is inclined by an angle α in relation to the wheel axis in such a way that the converter unit is aligned closer to the wheel axis than the brake cylinder. In this design it is of advantage that the brake cylinder, which generally is large in its diameter, is spaced to the axle or the axle element, respectively, of the utility vehicle, while the converter unit, which preferably reaches into the brake drum, is aligned closer to the wheel axis. By aligning the brake cylinder away from the wheel axis or the axle element, respectively, this facilitates the installation of the brake cylinder.

Advantageously, the ratio of the offset between the first and the third connecting section and the distance of the wheel axis of the transmission axis, in the region of the first connecting section, has values of 0.1 and 2, preferably of 0.3 an 1.5, and especially preferably of approx. 0.5 to 0.9. In order to save material at the supporting element or the carrier unit, respectively, it is preferred that the offset between the first and the third connecting sections are not essentially larger or smaller than the distance between the wheel axis and the transmission axis in the region of the first connecting section. The larger the ratio is, the more the section of the carrier unit is inclined between the first and the third connecting sections in relation to the vertical line of the wheel axis. If the ratio is virtually zero, the region between the first and the third connecting section is mainly aligned vertically to the wheel axis. The distance between the wheel axis and the transmission axis in the region of the connecting section is preferably measured along a vertical line to the wheel axis, where the offset between the first and the third connecting section is determined preferably along or in parallel to the wheel axis.

Especially preferably, by the cranked design of the carrier unit, it can be prevented that another connecting element is required between the carrier unit and the brake cylinder. This way, weight can be saved and the point of intersection between the carrier unit and the brake cylinder is more simple.

It is preferred in particular that the converter unit has a mounting section that reaches through the housing region, where a fixture is provided which fixes at the mounting section in order to fix the converter unit to the carrier unit. It is preferred to insert the converter unit along a transmission axis or, respectively, in parallel to the transmission axis into the housing region of the carrier unit, where a mounting section provided at the converter unit reaches through the entire housing region and can be fixed at the opposing side of the converter unit at the housing region by a nut or similar fixture, for example. In order to prevent a twisting of the converter unit around the transmission axis relative to the housing region or relative to the carrier unit, it may be preferred that corresponding recesses and projections are provided each at the housing region and the mounting section of the converter unit, which form-fit one to the other and, especially preferably, extend in parallel to the transmission axis. Preferably, the fixture by which the mounting section of the converter unit is fixed to the housing region is aligned at the side of the connecting section of the carrier unit, where, preferably, the fixture serves as a lay-on surface for the brake cylinder at the same time, in order to provide a sealed connection of the converter unit and the brake cylinder. It is preferred in particular that the mounting section of the converter unit has a male thread, into which a nut can form- and force-fit. This way, it is possible to reduce the installation efforts significantly, since only a nut or a fixture is provided to fix the converter unit to the carrier unit. Moreover, it can be preferred that, after mounting the converter unit by means of the fixture, the brake cylinder extends to the fixture and, thus, secures against twisting and, this way, the operation safety of the brake system is increased significantly. Furthermore, it may be preferred that the contact surface of the brake cylinder has a star-shaped recess to the first connection section or, respectively, a star-shaped recess is provided, which is suitable to secure the fixture form-fit against twisting in relation to the mounting section of the converter unit.

Advantageously, the mounting section of the converter unit is designed in tube shape or sleeve-like, where the transmission element can be aligned in such a way to displaceably reach through the recess of the mounting section between the converter unit and the brake cylinder.

It is preferred that the first and the second connecting sections have fixtures to force-fit and/or to form-fit the brake cylinder or the converter unit, respectively, to the carrier unit. This way, especially preferably, additional bolts or screw elements can be waived, where their function is taken over preferably by form-fit, force-fit or material bond recesses already provided at the brake cylinder or the converter unit, which preferably feature a male thread. This way, again, the installation efforts can be reduced, because the number of parts to be provided and mounted is decreased.

In a preferred way, the offset and the extension of the housing region along the wheel axis is chosen in such a way that a connection line extends between the converter unit and a bearing section of the carrier unit vertically to the wheel axis. The carrier unit preferably has a bearing section, which serves, especially preferably, to pivot brake shoe elements. Moreover, it is preferred that the brake shoe elements pivot on a plane or along a plane, respectively, that runs vertically to the wheel axis.

In order to pivot the brake shoe elements, the converter unit preferably features piston elements, which preferably displace the ends of the brake shoe elements opposing the bearing section of the carrier unit. As a consequence, it is especially preferred that the piston elements of the converter unit and the bearing section of the carrier unit are located in a plane that is vertical to the wheel axis. Thus, it is preferred to choose the extension of the housing section along a wheel axis and the offset between the first and the third connecting section in such a way that the converter unit and, especially preferably, the piston elements of the converter unit are aligned in the same plane as a bearing section that has to be provided at the carrier unit. Especially preferably, the bearing section is aligned offset to the third connecting section of the carrier unit, where the direction of the offset of the bearing section is opposed to the direction of the offset of the first connecting section to the third connecting section.

In a particularly preferred design, the carrier unit is two-piece, where the first and the second connecting sections are provided at a first supporting element, where a bearing section is provided to bear at least one brake shoe element at a second supporting element and where the third connecting section is formed by recesses of the supporting elements. In order to simplify the installation, it is preferred to design the carrier unit two-piece, where it is especially preferred that the third connecting section for fixing to the axle element is formed equally by the first and the second supporting elements. Here, it is especially preferred that the first and the second supporting elements have each a crank, preferably a circular recess, where the two recesses at the supporting elements, once assembled, combine to the third connecting section of the carrier unit. Furthermore, it is preferred that the two supporting elements can be form- and force-fitted one to the other by bolts or screws, for example, and be force-fitted to the axle element at the same time. In order to support the force-fit connection, it may be especially preferred to realize a firmly bonded connection by means of a glue or by soldering. Furthermore, appropriate recesses and projections can be provided both at the axle element and the two supporting elements, to support a force-fit or bonded connection by a form fit. The two-piece design is especially preferred, because the carrier unit does not have to be pushed onto the axle element along the wheel axis and, thus, the axle element may have undercuts with the section to which the carrier unit is fixed to the axle element. The carrier unit can be brought to the axle element transversely, in order to be fixed to the axle element by means of a force-fit, a form-fit or a firmly bonded connection.

It is especially preferred that the supporting elements can be fixed together and to the axle element in a form-fit and force-fit way. To do so, especially preferably screws may be used, which fix to the recesses provided in the supporting elements, in order to hold the supporting elements together and, preferably, at the same time, to fix the axle element to the third connecting section, which is formed by the two supporting elements. Here, it may be preferred that one of the supporting elements has recesses with female threads and the respective opposing supporting element has recesses through which a fixture can be inserted. Alternatively preferred, nuts may be used for fixing the fixtures to the supporting elements.

In another especially preferred design, the supporting element or, in a multi-piece design, at least one of the supporting elements can be designed as one-piece with the axle element. Particularly preferred, when using a casting process, the axle element and the one of the two supporting elements can be produced together, where the respective other supporting element can be fixed to the first supporting element, respectively to the axle element by means of a fixture. By this design, again, the installation efforts can be reduced, because the number of parts to be provided and mounted is decreased. Especially preferably, here the first supporting element, at which preferably the housing region and the first and second connecting sections are located, is designed as an unmounted component which can be fixed to the single-piece design of the second supporting element and the axle. This way, especially preferably, when servicing, the first supporting element can be removed easily together with the mounted brake cylinder and converter unit from the axle system, in order to be maintained in an ergonomically favorable way on a workbench.

In another especially preferred design, a first damping element is provided at the first connecting section, in order to bear the brake cylinder at the carrier unit in a vibration-cushioned way. Especially preferably when driving the utility vehicle on uneven ground, strong vibrations of the brake cylinder can occur relative to the carrier unit, which have a strong impact on the point of intersection, i.e. on the mounting part between the brake cylinder and the first connecting section. As a consequence, cyclical wear can occur. Therefore, it is especially preferred to cushion at least a certain part of the incurring vibrations between the brake cylinder and the carrier unit, for which preferably a first damping element is used. This may be aligned, for example, between the first connecting section and the brake cylinder and is preferably held in its position by a compression joint. Here, however, the flexibility of the damping element should not be too much, in order not to limit the directional transmission of the brake cylinder to the transmission element. Especially preferably, as a material for the damping element an ebonite or a fiber-reinforced compound may be used, which features both a certain flexibility and a vibration-cushioning effect at the same time. Advantageously, the first damping element also takes on a sealing function, in order to protect the contact between the brake cylinder and the first connecting section against the ingress of foreign matter or humidity.

In another especially preferred design, the transmission element supports itself via at least one flexible section in a vibration-cushioned way on the brake cylinder and/or the converter unit, in order to transfer an actuating power from the brake cylinder to the converter unit. Especially preferably in order to avoid resonance vibrations between the break and the brake cylinder during the brake process, it may be preferred to support the transmission element via vibration-cushioned, respectively via flexible sections on both the break cylinder and the converter unit. Here, especially preferably, irregular peaks of forces or moments of the breaking process can be cushioned, which otherwise impact the brake cylinder directly and could damage it severely. The flexible portions of the transmission element are preferably suitable to transfer the strong braking forces of the brake cylinder and must not deflect too much, in order not to delay or alleviate the braking action. Especially preferably, the flexible portion is form-fitted to the transmission element and can only displace together with it along a transmission axis. At the same time, it is secured against a displacement transversely to the transmission axis at the respective corresponding force transmission elements of the brake cylinder or the converter unit, respectively.

Especially preferably, the vibration-cushioned bearing cushions vibrations in the frequency spectrum of 2 Hz to 1 kHz, preferably 3 Hz to 200 Hz and especially preferably of 3 Hz to 50 Hz. The respective vibrations to be cushioned depend on the resonant frequencies of the oscillating brake system. Here, the mass and the excitation frequencies for potentially occurring vibrations of the chassis system play a role, where the vibration-cushioned bearing of the brake cylinder or the transmission element, respectively, is supposed to cushion vibrations of a certain range only. This way, it is prevented in particular that resonances occur and the brake system or the brake carrier build up in a certain frequency range, or that amplitudes increase and possibly cause severe damages to the brake cylinder and/or to the transmission element and/or to the converter unit, or even occur within the brake element during the breaking process.

Other advantages and features of the invention are shown by means of the following description with reference to the attached figures. Individual features of the design shown may be combined within the scope of the invention. The drawings show:

DETAILED DESCRIPTION OF THE PREFERRED EMBODIMENTS

Figure 1:
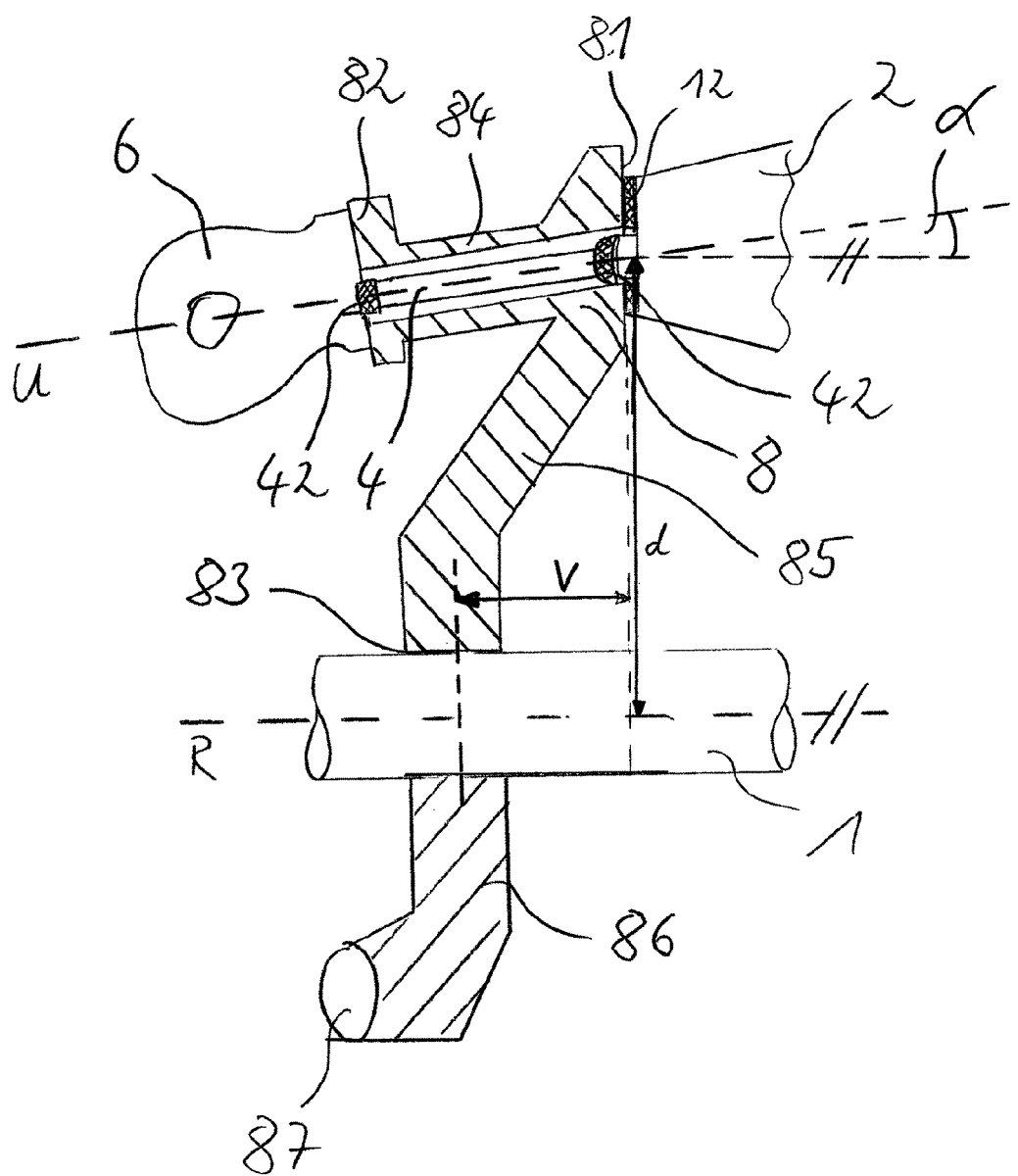
FIG. 1 is a sectional view of a preferred design of the brake carrier according to the invention.

The brake carrier shown in FIG. 1, preferably an expansion wedge drum brake or an expansion wedge drum brake carrier, respectively, features a carrier unit 8 to which an axle element 1 is fixed at a third connecting section 83. The axle element 1 is preferably a rotationally symmetric, preferably a tube shaped body and especially preferably the rigid axle or an axle stub of a utility vehicle. The third connecting section 83 is, especially preferably, a recess of the carrier unit 8, which is suitable to form a form-fit and force-fit connection to the axle element 1 and, this way, to fix the carrier unit 8 to the axle element 1. Furthermore, the carrier unit 8 has a first connecting section 81, to which a brake cylinder 2 can be fixed to the carrier unit 8. Especially preferably, the brake cylinder 2 is supported via a damping element 12 at a first connecting section 81, where, especially preferably, possible vibrations between the carrier unit 8 and the brake cylinder 2 can be cushioned. Moreover, it is shown that the first connecting section 81 is preferably aligned to the third connecting section with an offset v. Here, the offset is measured preferably in parallel to a wheel axis R and from the center extension of the third connecting section 83 along the wheel axis R to the center extension of the first connecting section 81 along the parallel line to the wheel axis R. In other words, the carrier unit 8 is cranked. Here, it is especially preferred that the crank is designed in such a way as to oppose the wheel of the utility vehicle which is to be carried by the axle element. Consequently, in the figure, this crank is to the right, or, respectively, the first connecting section 81 is aligned further to the right than the third connecting section 83, since the wheel of the utility vehicle (not shown) is pivoted preferably at the axle element 1. Furthermore, the carrier unit 8 has a second connecting section 82, to which a converter unit 6 can be fixed to the carrier unit 8. The converter unit 6 is preferably an expansion wedge unit of a drum brake or, respectively, an expansion wedge drum brake. Between the first connecting section 81 and the second connecting section 82, the carrier unit 8 has a housing region 84, which is especially preferably tube shaped and serves to carry a transmission element 4 and to support the brake cylinder 2 and the converter unit 6 against each other or in a defined position relative to each other. For this purpose, the housing region 84 is designed preferably sleeve-like and has flanges at its respective ends or, respectively, at the first and the second connecting section 81, 82, in order to take fixtures for fixing the converter unit 6 and the brake cylinder 2. Here, the transmission element 4 has the function of transferring an actuating power from the brake cylinder 2 to the converter unit 6, in order to displace the piston elements provided within the converter unit 6. It is preferred in particular that the transmission element 4 is supported via flexible sections 42 both to the brake cylinder 2 and to the converter unit 6. By means of these flexible sections 42, the direct transmission of vibrations or strokes from the converter unit 6 to the brake cylinder 2 or vice versa, as well as the occurrence of resonant vibrations within the brake system can be reduced. Furthermore, the transmission element 4 transfers a force, mainly along a transmission axis U, where the transmission axis U is preferably inclined by an angle α in relation to the wheel axis. Especially preferably, the carrier unit 8 is designed two-piece, where a first supporting element 85 is provided which has a first connecting section 81, a second connecting section 82 and a housing region 84, as well as a second supporting element 86 which has a bearing section 87. Especially preferably, the bearing section 87 serves to pivot at least one brake shoe element and has, for this purpose, preferably a ball socket, for example, which supports the ball joint of a brake shoe element. Especially preferably, the transmission axis U is spaced at the section of the first connecting section 81 from the wheel axis R by a distance d. Here, it is especially preferred that the ratio of the offset v and the distance d has values between 0.1 and 2, preferably 0.3 and 1.5 and especially preferably of approx. 0.6. Especially preferably, the angle α has values between 0° and 30°, especially preferably 1° and 15° and especially preferably and angle of 10°. By amending the angle α, the brake cylinder 2 can be set into a position closer or farther away from the axle element 1, which facilitates the installation of the brake cylinder 2 to the carrier unit 8 and, in particular, can be adapted to the geometric conditions of the chassis of the utility vehicle.

Figure 2:
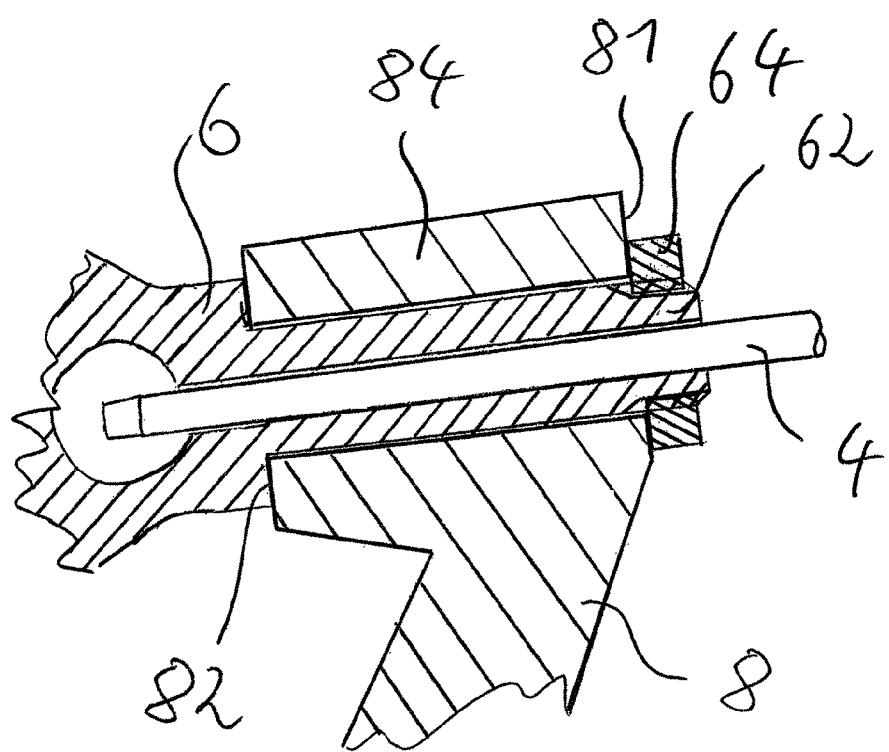
FIG. 2 is a sectional view of a preferred design of the brake carrier according to the invention.

FIG. 2 shows a sectional view of a preferred design of the carrier unit 8 and, in particular, the converter unit 6. Here, the converter unit 6 has a mounting section 62, which, preferably, can be inserted through a housing region 84 and which has a male thread in the area of its first connecting section 81, to which a fixture can attach. This way, it is possible to fix the converter unit 8 by means of only one fixture 64 and, thus, also only by one installation step to the carrier unit 8, where, especially preferably, longitudinal grooves can be provided in order to secure the converter unit 6 against rotation in relation to carrier unit 8. Furthermore, it is preferred that the converter unit 6 has a nose or an edge in the area of the second connecting section 82, by which the converter unit is supported by the carrier unit 8. Especially preferably, the fixture 64 is designed in such a way that the brake cylinder 2 can lay upon the fixture 64 with a contact surface for this purpose, where, at the same time, a sealing connection can be achieved between the first connecting section 81, the fixture 64 and the brake cylinder 2.

With this preferred design, the transmission element 4 is taken both by the housing region 84 and the mounting section 62, which is inserted into the housing region, where the mounting section 62 of the converter unit 6 is designed especially preferably as a tube or sleeve-like.

Figure 3:
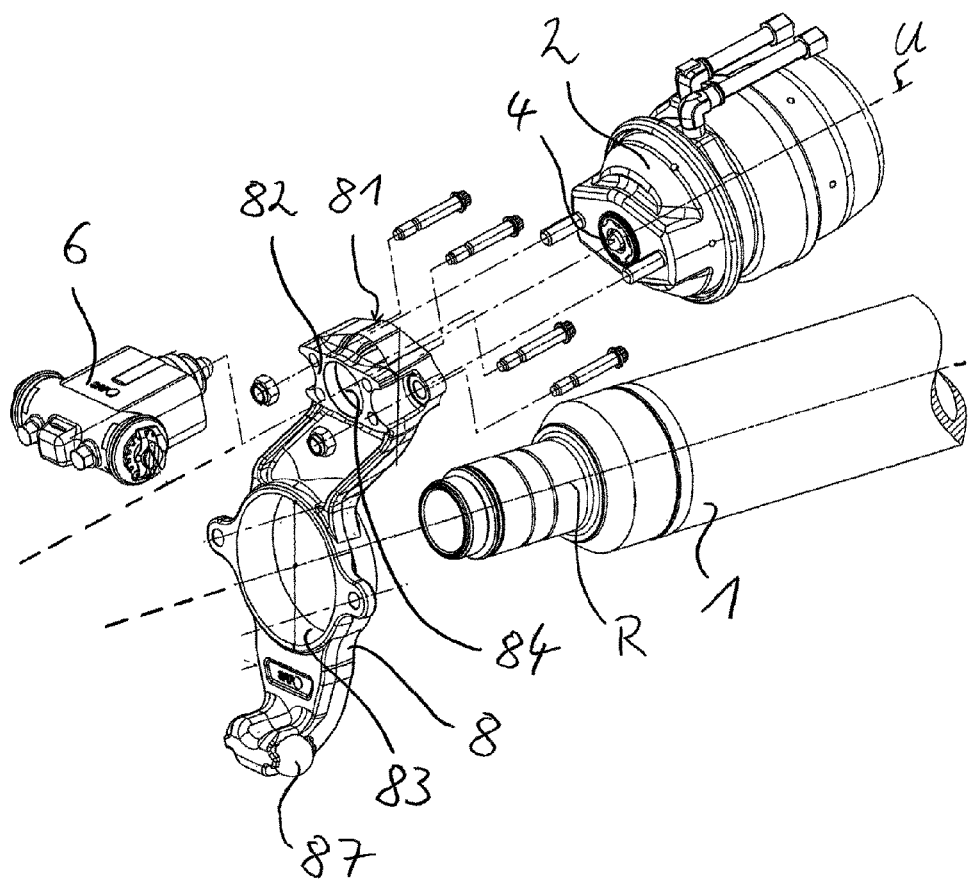
FIG. 3 is an exploded perspective view of a preferred design of the brake carrier according to the invention.

FIG. 3 shows an exploded perspective view of a preferred brake system with a brake carrier according to the invention. Here, a converter unit 6 and a brake cylinder 2 can each be fixed to the connecting sections 81, 82 of the carrier unit 8, where, for this purpose, especially preferably, screw element is attach, especially preferably to the threads provided at the converter unit 6 and the brake cylinder, or to nuts which have to be provided additionally. In the example, the transmission element 4 is shown recessed into the brake cylinder 2, where it extends when a pressure is applied to the preferably pneumatically operated brake cylinder 2 and comes into contact with an element especially provided for this purpose at the converter unit 6. Furthermore, the geometry of the carrier unit 8, especially designed for a good flow of forces, is shown, which ensures that high torques and braking forces can be transferred via the converter unit 8 and the bearing section 87 to the carrier unit 8, where the carrier unit 8 can be fixed again to the axle element 1, in order to transfer moments and forces to the axle element 1. In a particularly preferred design, the carrier unit 8 is one-piece, and, preferably, is fixed by means of a welded or soldered connection to the axle element 1.

LIST OF REFERENCE NUMBERS

1. Axle element
2. Brake cylinder
4. Transmission element
6. Converter element
8. Carrier element
12. First damping element
42. Flexible section
62. Mounting section
64. Fixture
81. First connecting section
82. Second connecting section
83. Third connecting section
84. Housing region
85. First supporting element
86 Second supporting element
87. Bearing section
R Wheel axis
U Transmission axis
v Offset first/third connecting section
d Distance transmission axis—wheel axis
α Angle

The invention claimed is:

1. A drum brake, comprising:
a brake cylinder;
a converter unit;
a carrier unit having a first connecting section configured to be fixed to the brake cylinder, and a second connecting section configured to be fixed to the converter unit;
wherein between the first connecting section and the second connecting section a housing region is provided for receiving a transmission element, wherein the transmission element is configured to be substantially linearly displaced by the brake cylinder, and wherein the transmission element at least one of includes a wedge member and is configured to engage a wedge member at the converter unit;
wherein the brake cylinder, the transmission element and the converter unit are configured to be fixed to an axle element of a vehicle via the carrier unit;
wherein the transmission element for force transmission is configured to be displaced mainly along a transmission axis;
wherein the transmission axis is tilted or inclined in relation to a wheel axis by an angle in such a way that the converter unit is aligned closer to the wheel axis than the brake cylinder;
wherein the carrier unit is configured to be fixed in a third connecting section at the axle element;
wherein the first connecting section is aligned offset along the wheel axis to the third connecting section; and
wherein the relation of the offset between the first and third connecting sections and the distance between the wheel axis and the transmission axis in the region of the first connecting section has values between about 0.1 and about 2; and
wherein the carrier unit is two-piece, the first and second connecting sections are provided at a first supporting element, a bearing section is provided to bear at least one brake shoe element at a second supporting element, and wherein the third connecting section is formed by recesses of the supporting elements.

2. The brake carrier according to claim 1, wherein the relation of the offset between the first and third connecting sections and the distance between the wheel axis and the transmission axis in the region of the first connecting section has values between 0.3 and 1.5.

3. The brake carrier according to claim 2, wherein the relation of the offset between the first and third connecting sections and the distance between the wheel axis and the transmission axis in the region of the first connecting section has values between 0.5 and 0.9.

4. The brake carrier according to claim 2, wherein the converter unit is fixed to the carrier unit and has a mounting section, which reaches through the housing region, and wherein a fixture is provided at the mounting section in order to fix the converter unit to the carrier unit.

5. The brake carrier according to claim 4, wherein the offset and the extension of the housing region along the wheel axis is configured such that a connection line runs vertically to the wheel axis between the converter unit which is fixed to the carrier unit and a bearing section of the carrier unit.

6. The brake carrier according to claim 5, wherein the supporting elements can be form-fitted and force-fitted the one to the other and to the axle element.

7. The brake carrier according to claim 5, wherein at least one of the supporting elements forms an integral part of the axle element.

8. The brake carrier according to claim 7, wherein a first damping element is provided at the first connecting section in order to bear the brake cylinder in a vibration-cushioned way at the carrier unit.

9. The brake carrier according to claim 8, wherein the transmission element is supported by at least one flexible section in a vibration-cushioned way to at least one of the brake cylinder and the converter unit, in order to transfer an actuating power from the brake cylinder to the converter unit.

10. The brake carrier according to claim 8, wherein the vibration-cushioned bearing is designed to cushion vibrations in the frequency spectrum of from about 2 Hz to about 1 kHz.

11. The brake carrier according to claim 10, wherein the vibration-cushioned bearing is designed to cushion vibrations in the frequency spectrum of from about 3 Hz to about 200 Hz.

12. The brake carrier according to claim 11, wherein the vibration-cushioned bearing is designed to cushion vibrations in the frequency spectrum of from about 3 Hz to about 50 Hz.

13. The brake carrier according to claim 10, wherein the carrier unit is cranked.

14. The brake carrier according to claim 13, wherein the first and second connecting sections have fixtures to at least one of form-fit and force-fit at least one of the brake cylinder and the converter unit to the carrier unit.

15. The brake carrier according to claim 1, wherein the converter unit is fixed to the carrier unit and has a mounting section, which reaches through the housing region, and wherein a fixture is provided at the mounting section in order to fix the converter unit to the carrier unit.

16. The brake carrier according to claim 1, wherein the offset and the extension of the housing region along the wheel axis is configured such that a connection line runs vertically to the wheel axis between the converter unit which is fixed to the carrier unit and a bearing section of the carrier unit.

17. The brake carrier according to claim 1, wherein the carrier unit is two-piece, the first and second connecting sections are provided at a first supporting element, a bearing section is provided to bear at least one brake shoe element at a second supporting element, and wherein the third connecting section is formed by recesses of the supporting elements.

18. The brake carrier according to claim 17, wherein the supporting elements can be form-fitted and force-fitted the one to the other and to the axle element.

19. The brake carrier according to claim 17, wherein at least one of the supporting elements forms an integral part of the axle element.

20. The brake carrier according to claim 1, wherein a first damping element is provided at the first connecting section in order to bear the brake cylinder in a vibration-cushioned way at the carrier unit.

21. The brake carrier according to claim 1, wherein the transmission element is supported by at least one flexible section in a vibration-cushioned way to at least one of the brake cylinder and the converter unit, in order to transfer an actuating power from the brake cylinder to the converter unit.

22. The brake carrier according to claim 20, wherein the vibration-cushioned bearing is designed to cushion vibrations in the frequency spectrum of from about 2 Hz to about 1 kHz.

23. The brake carrier according to claim 22, wherein the vibration-cushioned bearing is designed to cushion vibrations in the frequency spectrum of from about 3 Hz to about 200 Hz.

24. The brake carrier according to claim 23, wherein the vibration-cushioned bearing is designed to cushion vibrations in the frequency spectrum of from about 3 Hz to about 50 Hz.

25. The brake carrier according to claim 1, wherein the carrier unit is cranked.

26. The brake carrier according to claim 1, wherein the first and second connecting sections have fixtures to at least one of form-fit and force-fit at least one of the brake cylinder and the converter unit to the carrier unit.

* * * * *

UNITED STATES PATENT AND TRADEMARK OFFICE
CERTIFICATE OF CORRECTION

PATENT NO. : 9,488,236 B2
APPLICATION NO. : 14/355076
DATED : November 8, 2016
INVENTOR(S) : Drewes et al.

Page 1 of 2

It is certified that error appears in the above-identified patent and that said Letters Patent is hereby corrected as shown below:

On the Title Page

Abstract, Line 8:
Delete "an"

In the Specification

Column 1, Line 54:
Delete "to"

Column 2, Line 14:
"of" should be — or —

Column 3, Line 32:
"an" should be — and —

Column 5, Line 24:
"form fit" should be — form-fit —

Column 6, Line 30:
"break" should be — brake —

Column 6, Line 33:
"break" should be — brake —

Column 6, Line 35:
"breaking" should be — braking —

Column 6, Line 62:
"breaking" should be — braking —

Signed and Sealed this
Fifth Day of June, 2018

Andrei Iancu
*Director of the United States Patent and Trademark Office*

CERTIFICATE OF CORRECTION (continued)
U.S. Pat. No. 9,488,236 B2

Column 8, Line 21:
"and" should be — an —

Column 8, Line 55:
After "preferably," insert -- a --

Column 8, Line 56:
"attach" should be — attached —

In the Claims

Column 9, Claim 1, Line 43:
Delete "at least one of"

Column 9, Claim 1, Line 59:
Delete "and"